Figure 1:
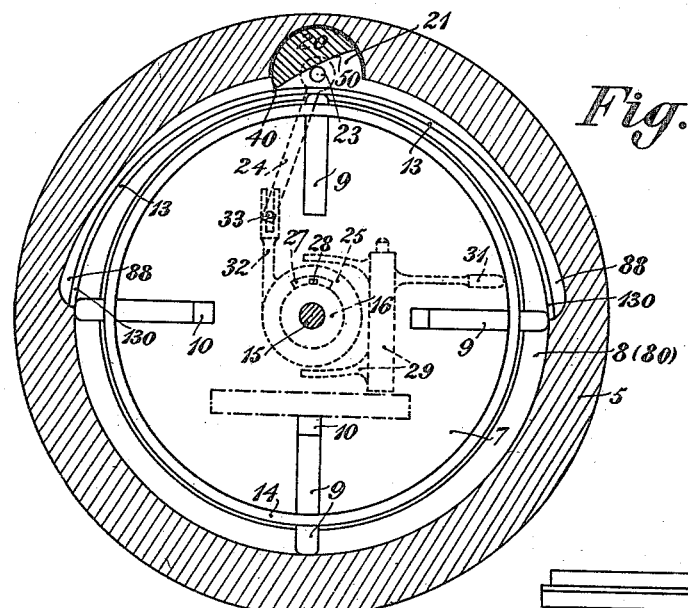

J. C. HANSEN-ELLEHAMMER.
HYDRAULIC COUPLING.
APPLICATION FILED NOV. 18, 1912.

1,127,758.

Patented Feb. 9, 1915.
2 SHEETS—SHEET 1.

Witnesses:—
L. H. Staaden.
Wm. F. Coogan.

Inventor
Jacob Christian Hansen-Ellehammer
by his Att'y

J. C. HANSEN-ELLEHAMMER.
HYDRAULIC COUPLING.
APPLICATION FILED NOV. 18, 1912.

1,127,758.

Patented Feb. 9, 1915.
2 SHEETS—SHEET 2.

UNITED STATES PATENT OFFICE.

JACOB CHRISTIAN HANSEN-ELLEHAMMER, OF COPENHAGEN, DENMARK.

HYDRAULIC COUPLING.

1,127,758. Specification of Letters Patent. Patented Feb. 9, 1915.

Application filed November 18, 1912. Serial No. 731,944.

*To all whom it may concern:*

Be it known that I, JACOB CHRISTIAN HANSEN-ELLEHAMMER, citizen of the Kingdom of Denmark, residing at No. 119 Istedgade, Copenhagen, Denmark, have invented certain new and useful Improvements in Hydraulic Couplings, of which the following is a specification.

My invention has for its object to provide an improved hydraulic coupling adapted to be interposed between a positive prime mover, a driving shaft or other driving member, and a machine for doing work, a counter shaft, a velocipede, a driving screw, a propeller or other driven member. The improved coupling enables a uniform transmission of power to be obtained which is accurately dependent upon the particular adjustment, irrespective of the fact whether the total amount of power or speed or only a part thereof or none at all is to be transmitted from the driving member or from the main part of the coupling connected thereto to the other part of the coupling, which latter is connected to the particular driven member.

The improved coupling is constructed in such a way that a substantially annular liquid passage is provided between the coupling members, of which one is provided with one or more pistons which work in the liquid passage and can be thrust in and out transversely thereto in one direction, while the other coupling member is provided with a suitable piston guiding device and with a movable projection, which lies in the vicinity of the inner or turning point of the piston, (that is to say at or near the point where the piston is in its innermost position) and which, by means of an externally operated arrangement can be caused to entirely uncover the liquid passage, in which case the coupling acts as a frictionless idle member; or to entirely shut off the liquid passage, in which case the coupling acts as a rigid and positive connecting member; or else to shut off the liquid passage more or less only, in which case the power or speed which is transmitted is inversely proportional to the volume of liquid which flows through the constricted area produced by adjustment of the projection.

According to this invention the pistons which are carried by one coupling part, are guided by an elastic band-shaped member connected to the other coupling part. The passage for liquid is cut off or closed by an approximately semi-cylindrical member an edge of which is adapted to bear against the piston guiding band. At the ends of the working section of the liquid passage enlargements are provided.

Figure 2:
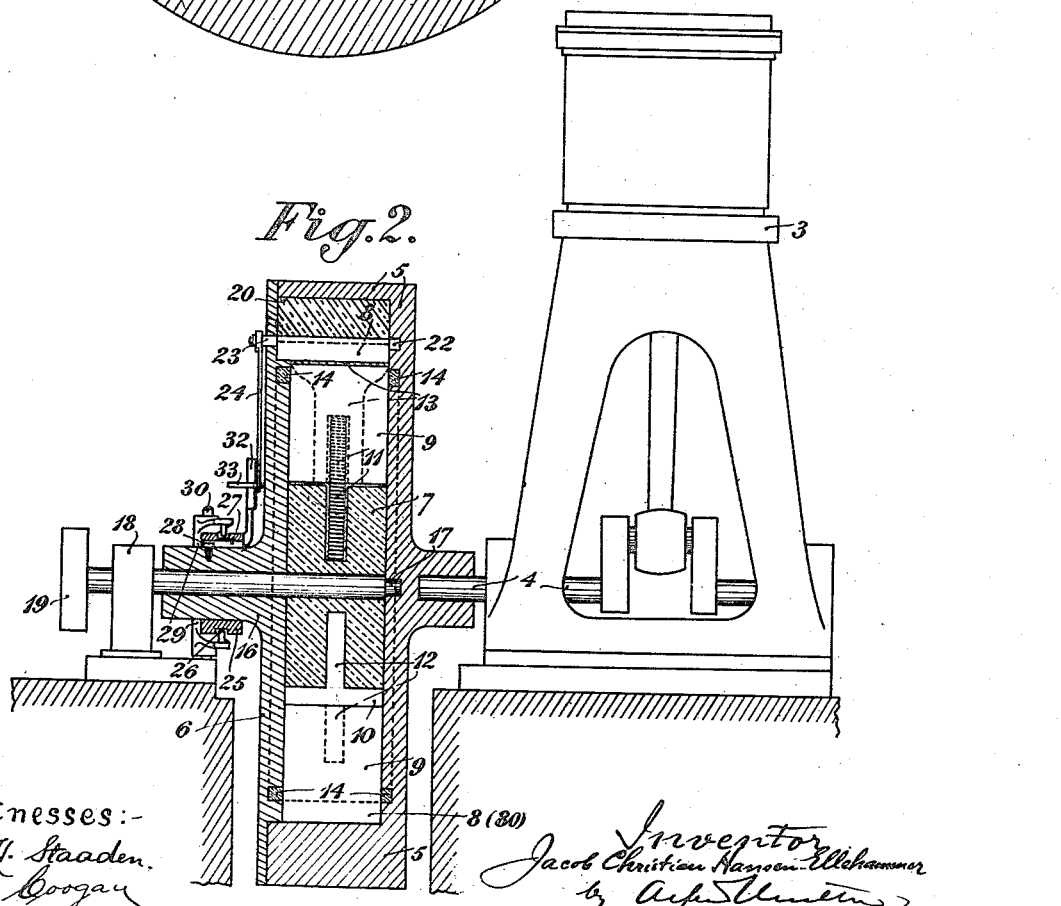
Figure 3:
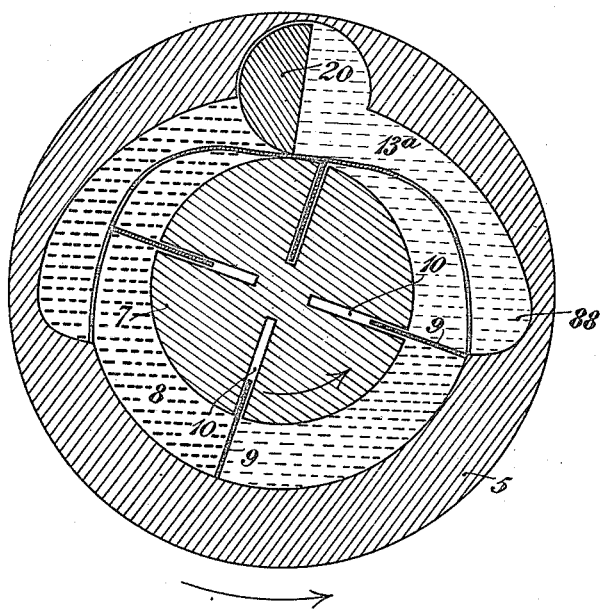
Figure 4:
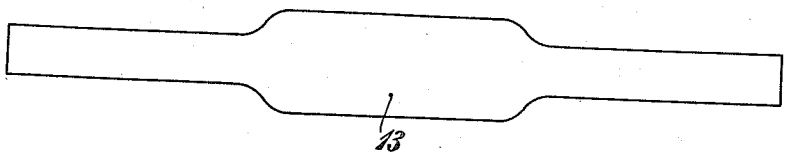

A coupling according to my invention is diagrammatically illustrated in the accompanying drawing, Figure 1 being a transverse section along B—B in Fig. 2 and Fig. 2 a view partly in longitudinal section along A—A in Fig. 1 and partly in elevation. Fig. 3 is a similar section as Fig. 1 showing diagrammatically the distribution of pressures of the liquid; Fig. 4 is a development of the elastic band-shaped member. In Fig. 2 the coupling is shown by way of example as constituting a flywheel for a motor, packings for insuring fluid tightness and similar details having all been omitted for the sake of clearness.

In the construction illustrated as an example the two main members of the coupling lie one within the other co-axially, and the outer member of the coupling is the driving member having the adjustable projection while the inner member of the coupling, namely the member provided with the pistons (of which four are shown in the drawing) is the driven member. The adjustment of the projection is effected by a rotary movement derived from a sleeve mounted on the hub of the driving member and the pistons are guided by an elastic band-shaped member which is eccentrically arranged in the liquid passage with its ends attached to the outer member of the coupling, the middle part bearing loosely against the inner member of the coupling and forming the inner turning point of the piston.

3, Fig. 2, is the motor, 4 its crank shaft, 5 the outer or main member of the coupling connected thereto, 6 the end wall or cover of the main member, 7 the driven or inner main member of the coupling, 8 the liquid passage, 9 the pistons, 10 the recesses formed in the member 7 to receive the said piston which recesses may be of any desired number and extend in any desired direction.

11 are the springs which act upon the pistons, (only one spring is shown in Fig. 2), and 12 are the recesses formed in the member 7 and in the pistons for containing these springs.

13 is the band-shaped guiding member provided for the pistons 9 and arranged eccentrically in the liquid passage 8, 14 are packing rings on both sides of the member 7 which rings are located in circular grooves formed therefor in the outer member 5, 6 of the coupling, 15 is the driven shaft which is connected to the member 7 of the coupling, 16 is the hub of the cover 6 by which the driven shaft 15 is tightly packed and in which it runs.

17 is a guide pin and 19 is a flange for connection to the particular parts to be driven which are not shown.

20 is the substantially semicylindrical constricting member or adjustable projection, 21 a suitably shaped recess in the member 5 in which recess the member 20 is carried, 22 is one of the bearing journals of the member 20, 23 the other journal therefor which journal is prolonged outwardly through the cover 6, and 24 is an arm attached to the journal 23.

25 is a sleeve mounted to slide and rotate on the hub 16, and 26 is a circular groove in the outer periphery of this sleeve, 27 is an inclined transverse groove formed in the inner periphery of the sleeve 25; 28 is a pin fixed in the hub 16 and engaging in the said groove 27, 29 is a fork having pins which engage in the circular groove 26, 30 is the fixed pivot of the fork and 31 the controlling handle of the fork.

32 is an arm or a fork attached to the sleeve 25, indicated in dotted lines in Fig. 1, and 33 is a pin of suitable length attached to the crank arm 24 of the constricting member 20 adapted to be operated by the arm 33.

Under normal conditions the sleeve 25 follows the movements of the hub 16 and consequently rotates with the member 5, 6 of the coupling; it therefore also follows the circular motion of the constricting member 20. When sleeve 25 is moved axially however by means of the fork 30, 31, it will be caused to move angularly or in a rotary sense relatively to its normal movement owing to the inclination of the transverse groove 27, so that the arm 32 will be swung outwardly, carrying with it the pin 33 and crank arm 24 and thereby altering the position of the constricting member 20.

In the drawing the constricting member 20 is in a position in which it entirely closes the liquid passage 8 by bearing with its inner edge 40 tightly against the guiding band 13 which is thereby firmly pressed against the cylindrical outer surface of the inner member 7 of the coupling. The liquid, which may be oil or glycerin and completely fills the passage 8, is therefore prevented from circulating in the passage 8, and will consequently act as a connecting medium between the constricting member or projection 20 and the piston or pistons 9, which latter assume fully extended positions in that part of the liquid passage 8, that is to say in the working section marked (80) in the lower half of Fig. 1, where the passage is bounded by coaxial cylindrical surfaces. According to requirements the liquid may be either practically incompressible, or may contain suspended air and be thereby rendered somewhat compressible.

When the constricting body 20 assumes a position in which its flat or slightly curved surface 50 does not extend beyond the cylindrical inner surface of the member 5 the liquid passage 8 will be fully open throughout its whole length, the guiding band 13 being perforated at those parts which lie at both sides of the constriction point (40) that is to say at both sides of the point hereinbefore designated as the inner or turning point of the piston; or the guiding band 13 may be provided with large openings 131 at these parts or be made considerably less in width than the working passage, see the dotted lines in Figs. 2 and 4, so that the said portions of the guiding band although they extend transversely or almost transversely over the liquid passage, do not constrict the free cross sectional area thereof to any appreciable extent. In this case the driven member 19, 15, 7, 9 is carried along with the driving member 3, 4, 5, 13, 20, the reason being that the internal work done in the coupling, namely the movement of the guiding band 13 by the liquid and the consequent thrusting of the pistons 9 into their recesses 10, is effected practically without resistance and with so little friction that in comparison with the resistances which as a rule are produced at the corresponding external working parts, it may be entirely disregarded.

The internal work done in the coupling is effected without any appreciable resistance as the pistons 9 are without any load upon them during their movement. When a piston 9 moves from the top downwardly, say to the right in Fig. 1 and approaches the horizontal position, it will assume, in consequence of the concentric shape of the lower end 130 of the guiding band 13, or of the concentric shape of any other guiding device, and through the action of its spring 11, its fully extended working position, before it enters the working section (80) or before it has any load put on it, that is to say before it is subjected to a one-sided counter-pressure from the liquid which is driven forward by the projection 20 in a clock-wise direction for example. This movement of the pistons directly into the operative position prior to any load being put upon them is rendered possible by the fact that the liquid passage 8 is provided at the ends of the working section (80) with suitable enlargements 88, in consequence whereof there is outside and around the pistons, (which receive their final movement at this point) the same cross sectional area for the liquid as there is over the working section, in fact even a greater cross sectional area. No one-sided pressure is exerted by the liquid upon the pistons during their movement and the movement therefore takes place, practically speaking without any resistance. As similar conditions exist on the exit side of the working section (80,) on the left hand exit side for example in Fig. 1, the liquid will therefore, when the constricting member 20 assumes the open position as set forth, remain at rest together with the member 7, 9 of the coupling, while the member 5, 13, 20 will practically speaking rotate without any resistance outside and around the liquid inside the internal member of the coupling so that the coupling as aforesaid acts as a frictionless idle member.

When the constricting member 20 is caused to assume a certain intermediate position or, by operating the coupling through handle 31, passes through all the intermediate positions between the extreme positions last and first mentioned, a gradually increasing constriction of the liquid passage will be effected between the edge 40 and the member 7 of the coupling. The liquid will have a certain constant or increasing tendency to follow the member 5, 13, 20 of the coupling and will therefore act over the working section (80) with a certain constant or increasing force upon the pistons 9 and consequently upon the other driven members. The magnitude of this force is governed by rule for any given adjustment of the constricting member 20 and is also determined by the degree of constriction or the volume of the liquid flowing through the passage 8.

As it is of importance in many cases, particularly in the case of initial full load, that the coupling be thrown into action at a uniform, and not too great a speed, the device (31) for throwing it into action may be combined with some one or other suitable resistance device, such as a fluid pressure brake or the like, which insures the coupling being thrown into action at a uniform and suitable slow speed without however putting any brake on the operation of throwing the coupling out of action.

The details of the coupling shown and described and in particular the adjusting devices (24—33) of the constricting member are, as hereinbefore stated, to be regarded as examples only and may be modified in many ways without departure from the invention. Great importance is however attached to the elastic guiding band 13, firstly because it is a simple and cheap means of producing the guiding curves, which in themselves can be of any desired form and which the pistons follow between the enlargements, and secondly because it makes the fluid tight packing between the constricting member 20 or its edge 40 and the other member of the coupling, independent of any wear that may ensue. The band may be simply fixed in the passage 8 so that its bent over ends are elastically held in suitable hooks provided for them in the wall of the particular member of the coupling for example the outer member 5.

It is clear that the more the edge 40 of the member 20 is moved closer toward the cylindrical surface of the inner coupling member 7, the more will the cross sectional area of the liquid passage 8 be decreased, and consequently, the stronger will be the braking effect on the driven member. A change of speed may thus be obtained within considerable limits without the least jar.

Having now particularly described and ascertained the nature of the said invention and in what manner the same is to be performed I declare that what I claim is:

1. A hydraulic clutch comprising a driving element and a driven element, said elements inclosing a substantially annular liquid containing passage, a number of movable pistons mounted in one of said elements and adapted to travel in a direction transverse to said passage, an elastic band-shaped member connected to the other element for guiding said pistons, and a movable constricting member located in a recess of the said other element behind said band-shaped member.

2. A hydraulic clutch comprising a driving element and a driven element, said elements inclosing a substantially annular liquid containing passage, a number of movable pistons mounted in one of said elements and adapted to travel in a direction transverse to said passage, an elastic band-shaped member connected to the other element for guiding said pistons, and means for moving said pistons in engagement with said band-shaped member, and a movable constricting member located in a recess of the said other element behind said band-shaped member.

3. A hydraulic clutch comprising a driving element and a driven element, said elements inclosing a substantially annular liquid containing passage, a number of movable pistons mounted in one of said elements and adapted to travel in a direction transverse to said passage, and an elastic band-shaped member connected to the other element for guiding said pistons, and a substantially semi-cylindrical member provided with an edge adapted to be brought in contact with and bear against said band-shaped member.

4. A hydraulic clutch comprising a driving element and a driven element, the said elements inclosing a substantially annular liquid containing passage, a number of movable pistons mounted in one of said elements and adapted to travel in a direction transverse to said passage, and an elastic band-shaped member connected to the other element for guiding said pistons, and a movable constricting member located in a recess of the said other element behind said band-shaped member.

5. A hydraulic clutch, comprising a driving element and a driven element, the said elements inclosing a substantially annular liquid containing passage provided with enlargements on opposite sides, a number of movable pistons mounted in one of said elements and adapted to travel in a direction transverse to said passage, and an elastic band-shaped member connected to the other element for guiding said pistons, the said other element having enlargements therein near the ends of the band-shaped member for increasing the cross-sectional area of the said passage, and means for varying the cross sectional area of said passage.

In testimony whereof I affix my signature in presence of two witnesses.

JACOB CHRISTIAN HANSEN-ELLEHAMMER.

Witnesses:
 HJALMAR BOUTARD,
 KUND BOTTELET.